Aug. 8, 1961      E. O. DEATHERAGE      2,995,374
GAME DEVICE FOR TEACHING READING AND WORD PRONUNCIATION
Filed May 27, 1959
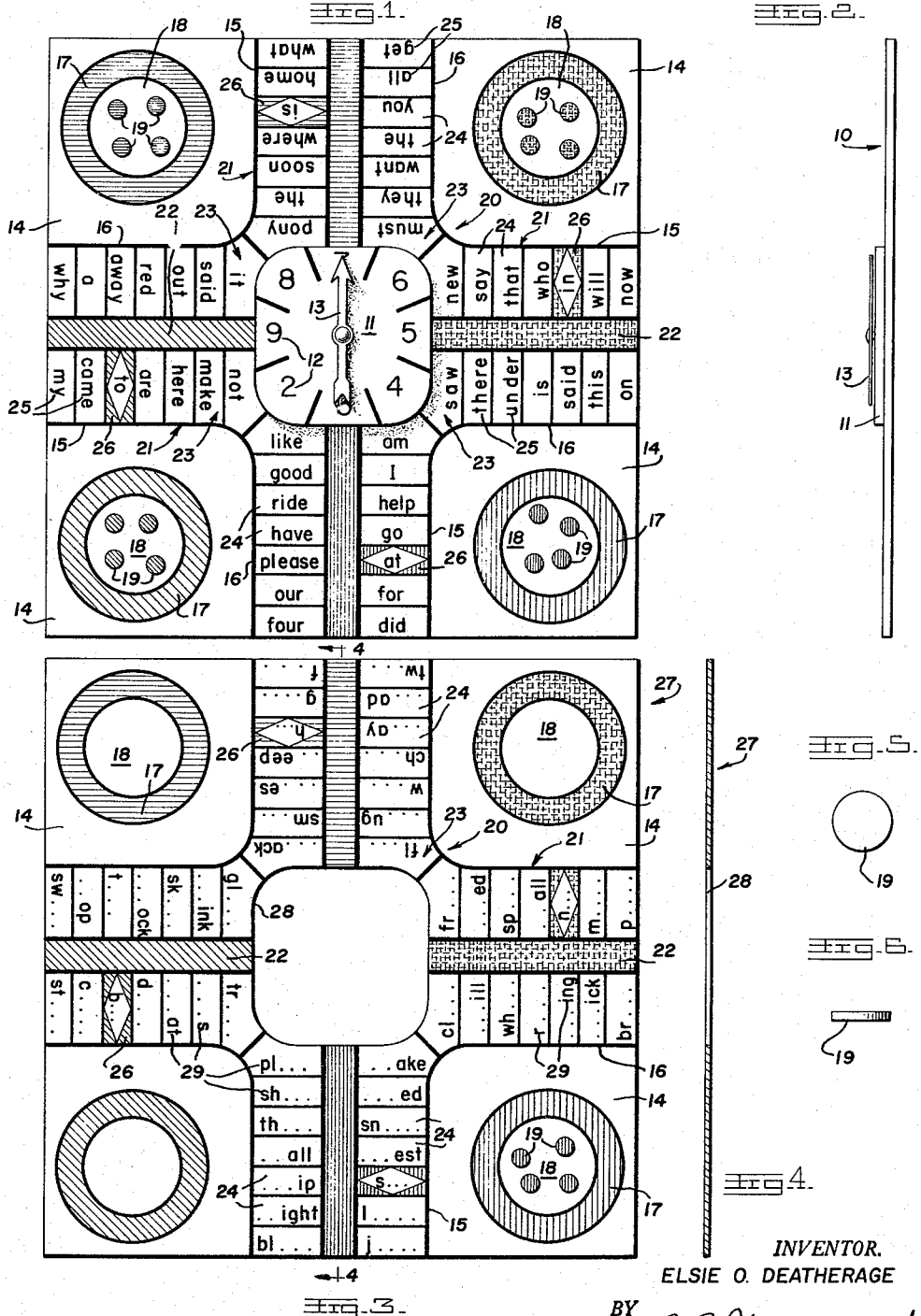
INVENTOR.
ELSIE O. DEATHERAGE
BY
ATTORNEY United States Patent Office 2,995,374
Patented Aug. 8, 1961

2,995,374
GAME DEVICE FOR TEACHING READING AND WORD PRONUNCIATION
Elsie O. Deatherage, Rte. 2, Box 216, Selah, Wash.
Filed May 27, 1959, Ser. No. 816,230
1 Claim. (Cl. 273—134)

This invention relates to means in the nature of a game for teaching reading and word pronunciation to children of school age and the like.

An object of the invention is to provide a teaching device of the above-mentioned character which will attract and interest children and instill in them a desire to learn the words and their correct pronunciations, so that they will be able to win the game.

A further object of the invention is to provide a word teaching game device of novel, simplified and attractive construction, and embodying movable game pieces which are advanced over spaces on a game board, and which spaces contain the words or parts of words which are to be mastered by the player for enabling him to advance the game pieces along a path made up by said spaces.

A further object is to provide a game of the above-mentioned character which may be played by a single player or a plurality of competing players using one or more game pieces.

Another object is to provide a word teaching game device including a game board or base having a basic word game pattern visibly marked thereon and constructed and arranged so that additional game board panels may be applied over the basic game board; said additional panels containing variations of the word game pattern to thereby render the game device practically limitless as to the number of different words or parts of words which may be taught to the children through its use.

Other objects and advantages of the invention will become apparent during the course of the following detailed description.

In the accompanying drawings, forming a part of this application and in which like numerals are employed to designate like parts throughout the same, FIGURE 1 is a plan view of a game board for use in teaching reading and pronunciation in accordance with the invention.

FIGURE 2 is a side elevation of the game board shown in FIGURE 1.

FIGURE 3 is a plan view of a removable game board panel containing a variation of the game pattern for use upon the game board of FIGURE 1.

FIGURE 4 is a central vertical section taken on line 4—4 of FIGURE 3.

FIGURE 5 is a plan view of a movable game piece employed in the game.

FIGURE 6 is a side elevation of the same.

In the drawings, wherein for the purpose of illustration is shown a preferred embodiment of the invention, the numeral 10 designates a preferably square basic game board formed of any preferred material such as plywood, plastic or the like. Formed or rigidly mounted centrally upon the game board 10 is a generally rectangular raised projection 11 for purposes to be described, and suitably visibly marked upon the top of the projection 11 near the margin thereof is a scale or dial graduated in terms of numerals 12, as indicated. These scale numerals are preferably spaced equidistantly as shown, and the numerals may begin at one point upon the scale with the digit "2" and run consecutively in an anti-clockwise or clockwise direction up to the numeral "9" as shown. A pointer 13 is pivoted between its ends for rotation to the center of the projection 11 for coaction with the scale numerals when the pointer is spun by the players, as should be obvious.

The game pattern is visibly marked in any desired manner upon the top face of the game board 10 as clearly shown in FIGURE 1. Corner substantially rectangular areas 14 are defined on the game board 10 by lines 15 and 16 extending at right angles to each other and perpendicular to the margins of the square game board. Centrally of each corner area 14, an annular area 17 is visibly marked upon the game board, and each annular area 17 is made in a different color, as for example, red, yellow, blue, and green, starting with the area 17 at the lower right hand corner of FIGURE 1 and proceeding anti-clockwise around the game board 10, as shown. The uncolored centers 18 of the areas 17 are adapted to serve as starting bases for one or more movable game or player pieces 19, having a color corresponding to the color of the adjacent annular area 17. The game pieces 19 for each starting base 18 preferably do not exceed four in number, and fewer than four of the game pieces 19 may be employed by each player if preferred, as will be more fully described. The game may be played with a single game piece 19 by each player, if preferred, and one starting base 18 and one or more correspondingly colored game pieces 19 are assigned to each player of the same, as will be further described. Each game piece 19 may be in the nature of a small colored disc of the desired thickness and color as indicated in FIGURES 5 and 6, and the game pieces may be circulated or they may have any other preferred shape.

The corner lines 15 and 16 which define the corner areas 14 also serve to define the margins of a game pattern or area upon the board 10 in the shape of a cross as shown generally at 20, FIGURE 1. Each arm or branch 21 of the area 20 extends between a pair of the base areas 18, and each branch area 21 is divided longitudinally at its transverse center by a straight stripe area 22 having a color which is the same as the color of one adjacent annular area 17. Preferably, the stripe area 22 at the left of the adjacent area 17 has the same color as such area 17 when the game board 10 is being viewed so that the words in the particular branch area 21 are upright. The stripe areas 22 are adapted to serve as "home" for the game pieces 19 after the same have been advanced over a prescribed path from the starting bases 18. The stripe areas 22 having the different colors are perpendicular to the marginal edges of the game board and extend between such marginal edges and the margins of the raised projection 11.

The stripe areas 22 and the lines bounding the same, together with the boundary lines 15 define on the game board and within the area 20 four L-shaped areas or paths 23, with each such path divided into a multiplicity of substantially equal rectangular transverse spaces 24. Each space 24 of each L-shaped path 23 has visibly provided thereon a desired word 25 whose reading and pronunciation it is the object of the invention to teach to the children playing the game. Any desired word may be provided upon each space 24, and the simple words shown in FIGURE 1 are for the purpose of illustration only, and it is desired not to limit the invention to any group of words. More complex words or parts of words will be provided for older and more advanced students, as should be obvious.

The four L-shaped paths 23 containing the spaces 24 with words 25 together constitute a continuous path around all of the branches 21 of the cross-shaped area 20 over which the game pieces 19 must travel during the playing of the game.

At any preferred space 24 in each L-shaped path 23, such space may be colored corresponding to the color of the adjacent area 17 and marked with a symbol such as a diamond or the like, as shown at 26, for a purpose to be described.

The game may be played in the following manner:

As many as four may play the game, and each player is assigned one of the starting bases 18 and one, two or more game pieces 19 of corresponding color to the adjacent areas 17 and 22 of like color. Each player in turn spins the pointer 13, and when the pointer stops on the numerals "2" or "5" of the dial, the particular player may take a game piece from its base 18 and place it upon the starting space 24, which is the endmost space adjacent the edge of the board 10 to the left of the particular base 18 and between such base and the home area 22 of corresponding color. Each player in turn follows the same procedure as the game progresses.

When the next turn for the player who started first arrives, he spins the pointer again and moves as many spaces forwardly on the cross-shaped area as the pointer indicates upon the numbered dial but only if the player can properly read and pronounce each word 25 as he advances forwardly. Until the words are learned properly, one player piece per player is enough to employ for the game, and after the words are mastered, as many as four game pieces per player may be used in the same manner.

As a further feature to stimulate interest, when a game piece 19 lands upon one of the colored spaces 26, it is "safe" and cannot be captured by an opposing player. However, when exactly overtaken by a game piece of an opposing player on any other space 24, a particular game piece is captured and must return to its starting base 18. The captor gains four spaces at this point providing he can read and pronounce the four words 25 on these spaces. Only two game pieces of like color may rest on a particular space 24. Two men on one space create a blockade which cannot be passed or captured. The first player who gets his game pieces or game piece to the home area 22 at the left of his starting base 18 wins the game. It should be understood that the game piece or pieces 19 for each player must traverse all four of the L-shaped paths 23 around the cross-shaped area 20 when traveling from a particular starting base 18 to the home area 22 of corresponding color.

Variations of the rules may be made up as desired to suit the needs of the players at different ages.

In FIGURES 3 and 4, there is illustrated an auxiliary game board panel 27 formed of cardboard, plastics material or the like and being thinner than the basic game board 10 and preferably of a thickness somewhat less than the height of the raised projection 11. The auxiliary panel 27 is substantially identical in shape and design to the basic game board 10 described in detail above, except for the fact that the panel 27 has a central generally rectangular opening 28 formed therethrough of a size and shape to snugly engage over the projection 11 when it is placed upon the game board 10. Projection 11 will hold the auxiliary game board panel 27 properly centered upon the game board 10 and the pointer 13 and scale having numerals 12 will be visible as before for use in conjunction with the auxiliary panel 27.

The panel 27, as stated, has substantially the identical lay-out or game area indicia as the game board 10, including the cross-shaped game area 20, starting bases 18 and home areas or stripes 22 of corresponding color to the starting bases. The difference resides in the fact that the spaces 24 of auxiliary panel 27 are provided with a different set of words from the game board 10 or parts of words such as their beginnings or endings, as indicated at 29 in FIGURE 3.

In connection with the auxiliary panel 27, the game may be played exactly in the same manner described above in connection with the basic game board 10. However, the use of the auxiliary panel with a different set of words or parts of words renders the device much more versatile for teaching reading and pronunciation. Exercises may be undertaken in the pronunciation of beginning or ending consonants and the like, as should be obvious. As many additional auxiliary panels 27 as preferred may be provided for use with the basic game board 10, and in this way, the game may be adapted to children of different ages and different abilities, and the game may be arranged to fit any grade level in school, such as the primary, elementary and junior high school levels. Each panel 27 is readily removable from the basic game board 10 for replacement by a similar panel, and if the projection 11 is formed thick enough, several of the panels 27 may be placed over the same in superposed relation and removed one at a time when desired.

It is to be understood that the form of the invention herewith shown and described is to be taken as a preferred example of the same, and that various changes in the shape, size and arrangement of parts may be resorted to, without departing from the spirit of the invention or the scope of the subjoined claim.

Having thus described the invention, I claim:

An educational game device for teaching reading and word pronunciation to children comprising a primary rectangular game board, a word game pattern visibly marked upon one face of the game board in the configuration of a cross having branches of equal length spaced ninety degrees apart angularly, said branches extending from the marginal edges of the game board toward the center thereof and intersecting the marginal edges at the longitudinal centers thereof, each branch of said pattern being divided centrally and longitudinally by a relatively narrow colored stripe adapted to serve as a home base for movable game pieces of like color, each of said stripes being colored distinctively differently from the remainder of the stripes, said stripes and the margins of the cross-shaped pattern forming a plurality of L-shaped paths for said game pieces, said L-shaped paths disposed inwardly of the square corners of the game board and defining therewith substantially square corner areas on the game board adapted to serve as starting bases for said movable game pieces and each being colored at least in part to correspond to the color of one of said stripes and one set of said movable game pieces, said L-shaped paths collectively forming a continuous zigzag path of substantial length on said pattern to be traversed by said game pieces, said L-shaped paths each divided into a multiplicity of relatively narrow rectangular spaces of equal width longitudinally of the paths, each said space having a single distinctively different word visibly marked thereon, said words positioned to be readable by players stationed at the ends of said branches of the cross-shaped pattern, a raised visible dial graduated numerically upon the center of the primary game board at the inner ends of said branches and being generally square so as to delineate the inner ends of said branches, a pointer spinably mounted upon said raised dial centrally thereof for coaction with the numerals of said dial, a plurality of sets of movable game pieces to be advanced by players from each starting base and along said L-shaped paths continuously toward the home base corresponding to a particular starting base and colored to correspond to a starting and home base of like color, and an auxiliary game board panel having a modified cross-shaped word game pattern visibly marked thereon and provided centrally with a generally square opening adapted to removably receive said raised dial therein when said auxiliary game board panel is placed over the primary game board in superposed relation thereto and with said opening registering with said raised dial and receiving the same to key said panel to the primary game board.

References Cited in the file of this patent

UNITED STATES PATENTS

| | | |
|---|---|---|
| 1,406,484 | Paris | Feb. 14, 1922 |
| 1,518,306 | Clegg | Dec. 9, 1924 |
| 1,616,328 | Nix | Feb. 1, 1927 |
| 2,801,856 | Medowar | Aug. 6, 1957 |